(12) United States Patent
Yang (10) Patent No.: US 7,546,667 B2
(45) Date of Patent: Jun. 16, 2009

(54) LATCH-TYPE TIGHTENING DEVICE STRUCTURE

(75) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 162 days.

(21) Appl. No.: 11/480,962

(22) Filed: Jul. 6, 2006

(65) Prior Publication Data

US 2007/0271738 A1    Nov. 29, 2007

(30) Foreign Application Priority Data

May 23, 2006    (TW) .............................. 95118346 A (51) Int. Cl.
*A44B 11/06*    (2006.01)
(52) U.S. Cl. .............................. 24/614; 24/200; 24/193; 24/197; 24/68 R; 24/134 R
(58) Field of Classification Search .................. None
See application file for complete search history.

(56) References Cited

U.S. PATENT DOCUMENTS 2,471,503 A * 5/1949 Ward et al. .................. 24/134 P

* cited by examiner

*Primary Examiner*—Jack W. Lavinder
(74) *Attorney, Agent, or Firm*—Leong C. Lei (57) ABSTRACT

A latch-type tightening device structure comprises a body constituted by a seat and a housing, wherein an interior of the body is provided with a one-way braking mechanism which enables a rope to glide in one direction. A rope enters into and reeves around the tightening device by which the rope can be gliding in one direction latching. A front edge of the body is provided with a tenon or a latching slot, such that the tightening device can be quickly locked with a fitting part in application.

7 Claims, 13 Drawing Sheets

LATCH-TYPE TIGHTENING DEVICE STRUCTURE

BACKGROUND OF THE INVENTION (a) Field of the Invention

The present invention relates to a latch-type tightening device structure, and more particularly to a device structure for tightening a rope for a ship cover such that the ship cover will not be blown off by a strong wind after the structure is connected with the ship cover, and is provided with rollers for enabling a smooth gliding of the rope. The present invention can be applied to a device used to tighten an opening of a bag or the like, and is especially used in a cover for an automobile, a yacht, or an aqua-bike.

(b) Description of the Prior Art

When a common vehicle such as a motorcycle, an automobile, a yacht, or an aqua-bike has to be parked and idle for a longer time, a dust-proof cloth or cover is usually used to cover it. This kind of cover can be used to prevent the vehicle from gaining dust or sand, and can prevent a casing of the vehicle from being cracked by exposure to the sun. As far as a transportation vehicle is concerned, most common covers used include a dust cover for an automobile, and a ship cover for a yacht, which can prevent the vehicle from gaining dust or sand, or from an entry of a small animal such as a kitten or a doggy, in order to keep clean. On the other hand, a cover in a specific shape is also used for a motorcycle or an aqua-bike for covering in an idle situation.

However, as the dust cover is generally covered on the exterior of the motorcycle, automobile, or yacht, it is easily to be blown off and dropped accidentally due to a strong wind. Accordingly, an effect of tightly binding is imperative.

In addition, most of fixing ends of this kind of one-way rope tightening device structure are hooked by tying dead knots to the ropes, such that the ropes can only be released from loose ends. Therefore, it will not achieve a function of completely unlocking the fixing ends quickly and conveniently, thereby limiting an operational mode in application.

Accordingly, an improved structure of tightening device is invented for providing a tightening to a rope without slipping, such that the automobile cover or ship cover will not to be blown off by a strong wind.

SUMMARY OF THE INVENTION

The primary object of the present invention is to provide a latch-type tightening device structure, which can actually tighten a rope to cause a slip-proof fixing effect, so as to achieve a tightening function upon being connected to an automobile or ship cover, thereby preventing the cover from being blown off by a strong wind.

Another object of the present invention is to provide a latch-type tightening device structure, a front end of which is provided with a tenon or a latching slot, so as to be quickly locked with a fitting part.

Accordingly, the present invention includes primarily a body constituted by a seat and a housing. The body is provided with a one-way braking mechanism enabling a rope to glide in one direction. The one-way braking mechanism includes two rollers, one turntable, one wheel, and one lock bolt. A depressing piece and a tenon are located at two sides of the lock bolt which can be rotated and restored elastically by the tenon connected with a spring. The depressing piece is pressed against one-way ratchets of the turntable, and the lock bolt is connected to a knob outside of the housing for controlling the rotation, such that the tightening device itself is provided with a one-way tightening of a rope without slipping. The one-way braking mechanism can also include a roller and a shaft located in a space enclosed by the seat and the housing. Side edges of the shaft are provided with stopping blocks, and the shaft is connected with and controlled by a knob to rotate. After the shaft is rotated, it can be restored elastically by a spring which is connected to the knob. The body can be installed with the tenon or latching slot, thereby being quickly locked with the fitting part in application.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
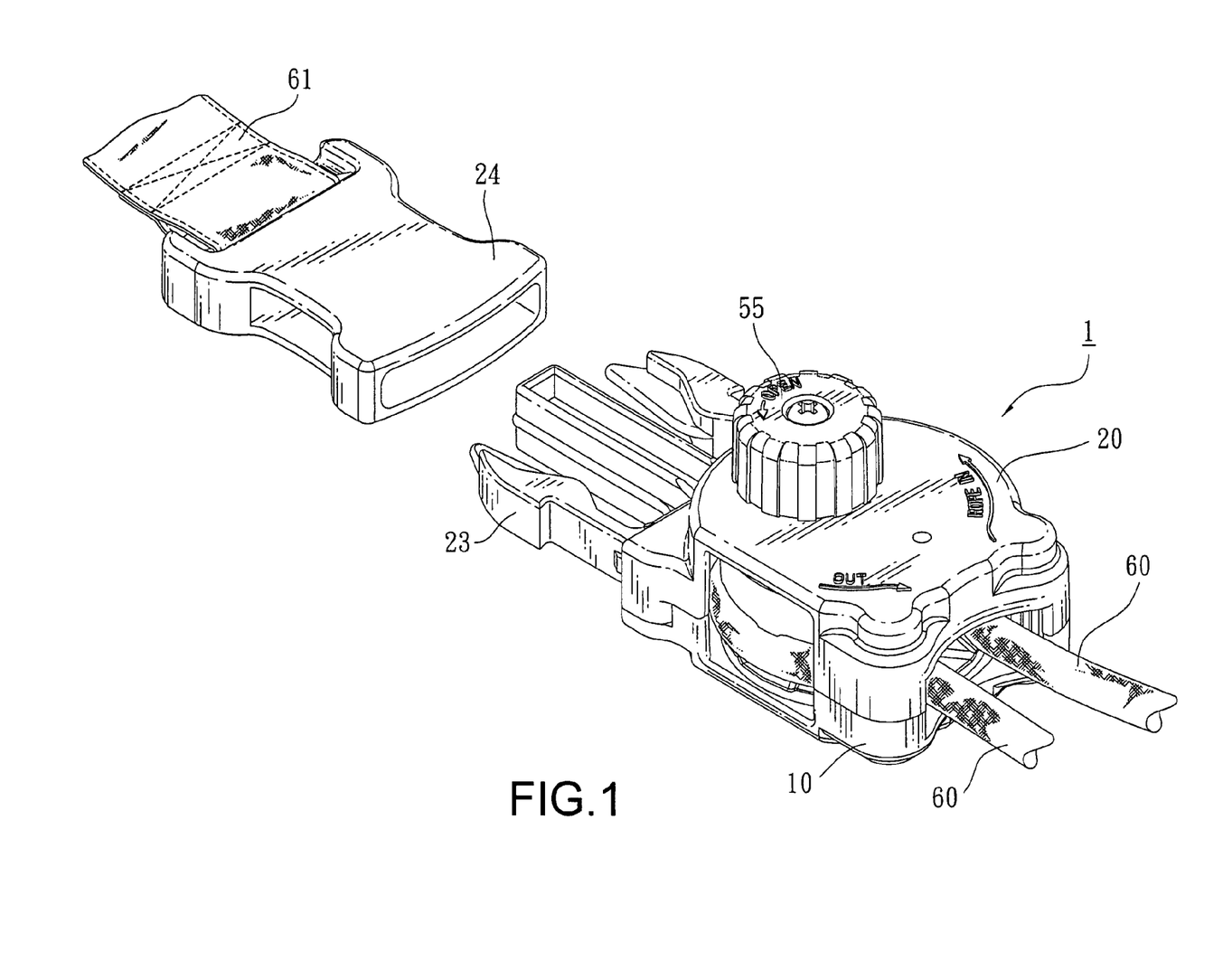
FIG. 1 shows a perspective view of the present invention.
Figure 2:
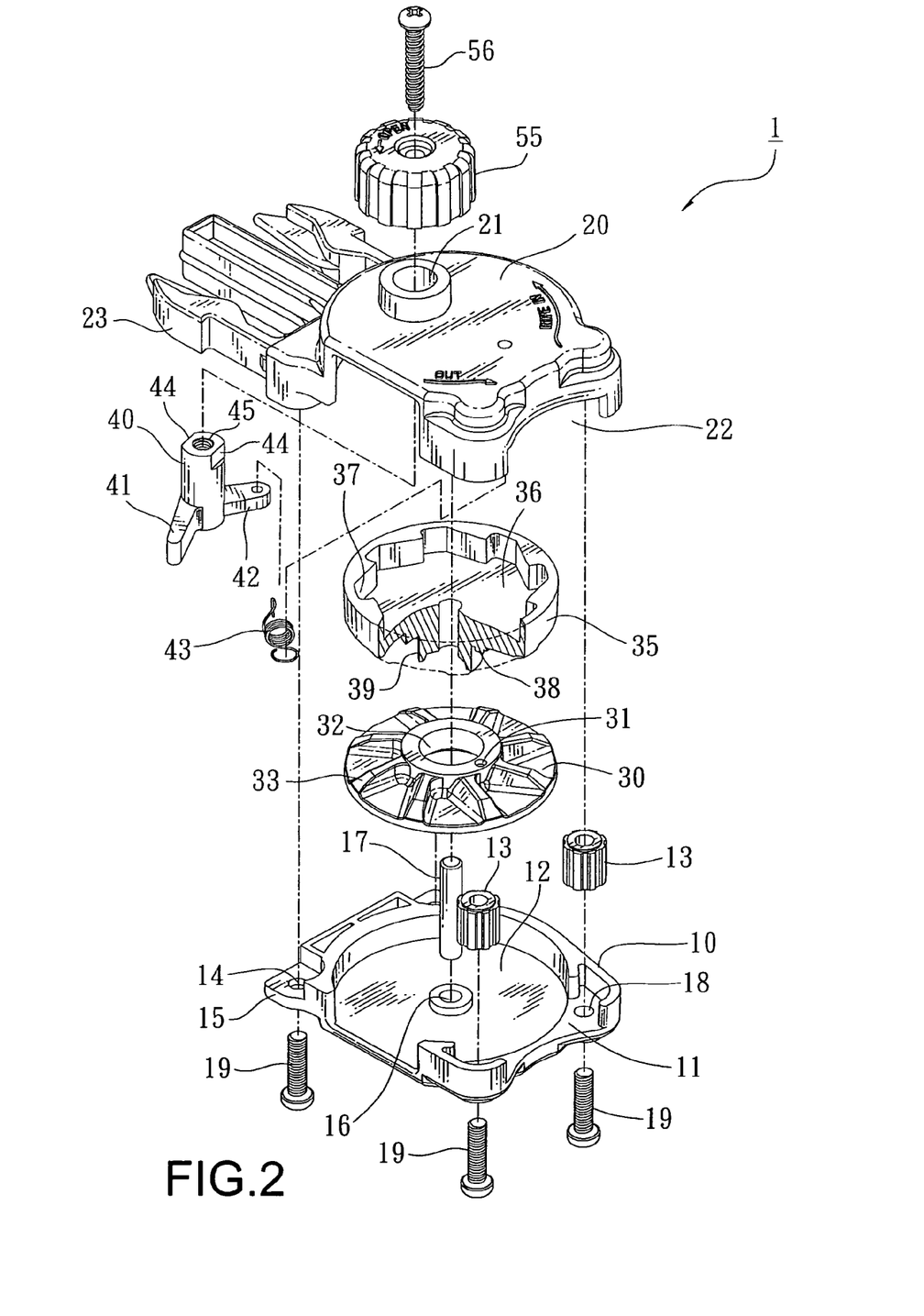
FIG. 2 shows an exploded view of the present invention.
Figure 3:
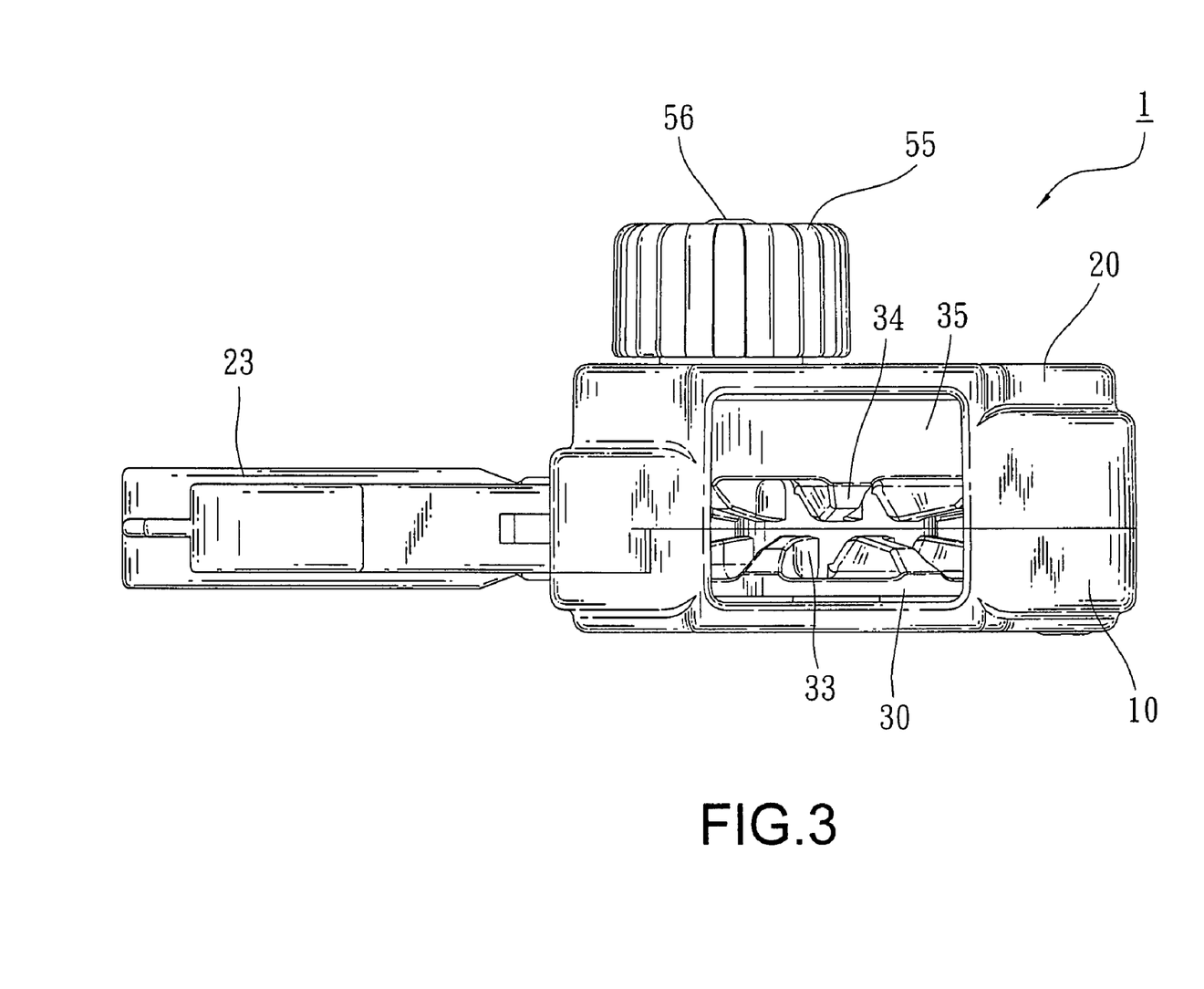
FIG. 3 shows a side view of the present invention.
Figure 4:
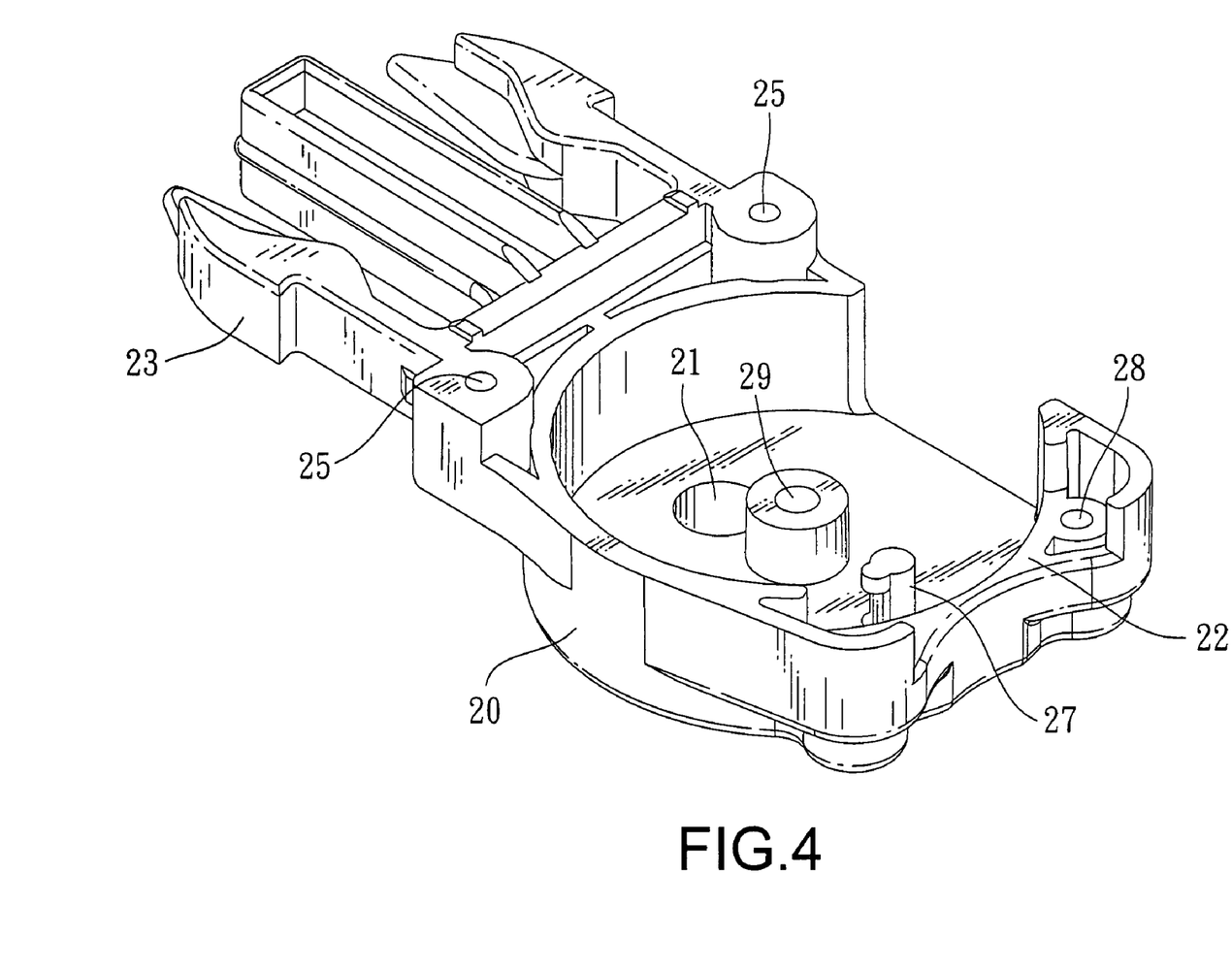
FIG. 4 shows a bottom view of a housing of the present invention.
Figure 7:
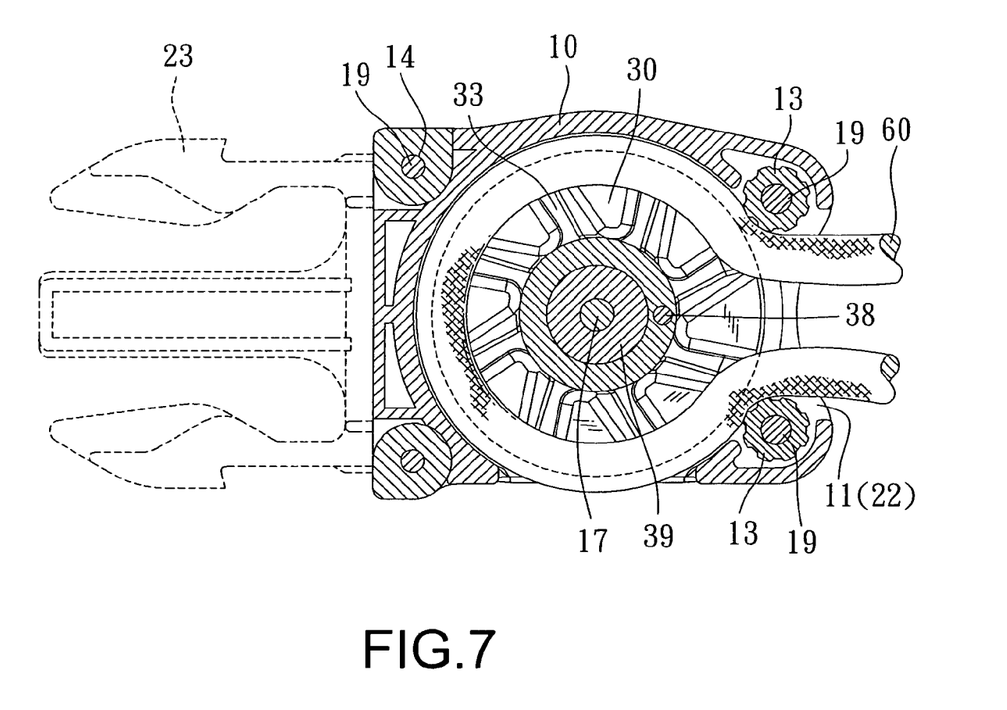
FIG. 7 shows a schematic view of reeving a rope of an embodiment of the present invention.

Referring to FIGS. 1 to 3, a tightening device 1 of a first embodiment of the present invention comprises primarily a seat 10, a housing 20, a turntable 30, a wheel 35, and a lock bolt 40. A front end of the tightening device 1 is provided with a tenon 23 which can be inserted into a latching member with its locking belt 61 being provided with a latching slot 24, wherein a rope access 11 is located at a rear end of the seat 10, and two bores 18 are located at two sides of the access 11, respectively. The bores 18 allow for screws 19 to be penetrated from a bottom to a top, and two rollers 13 are located in the seat 10 for locking the screws 19 into the bores 28 (as shown in FIG. 4) at the opposite housing 20, so as to fix the rollers 13 at a left and a right side to the access 11 respectively, thereby preventing a rope 60 (as shown in FIG. 7) from being cracked by a friction in gliding. An indentation 12 is located at a central part in an interior of the seat 10, and a hole 16 is located at a center of the indentation 12 for latching a central column 17. A projection piece 15 is located at a front end of the seat 10, and two through-holes 14 are located at two sides of a root part of the projection piece 15, respectively.

Referring to FIG. 2 and FIG. 4, the housing 20 can be covered with the seat 10 by matching their contours. A through-hole 21 is located on the housing 20, and an access 22 is also located at a rear end of the housing 20, whereas a tenon 23 is located at a front end of the housing 20, and two slot holes 25 are located behind the tenon 23, such that after the seat 10 is covered with the housing 20, they can be fixed at the slot holes 25 by transfixing screws 19 into the through-holes 14 from a bottom to a top. A rivet 24 can be inserted into a through-hole 25 on the projection piece 23 of the housing 20, and is riveted to a hole on the projection piece 15 of the seat 10. A positioning column 27 (as shown in FIG. 4) is located at a specific position of the housing 20. A tube section of the through-hole 21 is protruded from a top surface of the housing 20, with a knob 55 and a screw 56 installed above the through-hole 21, so as to enable the screw 56 to pass through the knob 55 and to be locked on the lock bolt 40. An indentation is also located at a bottom surface of the housing 20, with a bottom end of the through-hole 21, the positioning column 27, and a slot hole 29 being located in the indentation.

Referring to FIG. 2, a through-hole 32 is located at a center of the turntable 30, and a positioning hole 31 is located at a side of the through-hole 32. Ridges 33 which are radially extended are located at a periphery of the through-hole 32.

A hollow part 36 is located at a top surface of the wheel 35, with one-way ratchets 37 being located at an edge of the hollow part 36. On the other hand, a central column 39 having a through-hole and ridges 34 (as shown in FIG. 3) which are radially extended are located at a bottom surface of the wheel 35. A column head 38 is located at a side of the central column 39.

A depressing piece 41 and a tenon 42 are located at two sides of the lock bolt 40, respectively. The tenon 42 is provided with a hole for holding one end of a spring 43, a latching plane 44 is located on an exterior wall at a top end of the lock bolt 40, and a bore 45 is located at a top end of the lock bolt 40.

Accordingly, upon assembling, the two rollers 13 are fixed on the bores 18 at two sides of access 11 of the seat 10 with the screws 19, the central column 17 is then put into the hole 16, passed through the turntable 30 and the wheel 35, and fixed in the hole 29 at the bottom surface of the housing 20. The central column 39 of the wheel 35 is also put into the through-hole 32 at the center of the wheel 30, and the column head 38 of the wheel 35 is latched into the positioning hole 31. On the other hand, the top end of the lock bolt 40 is passed through the through-hole 21 of the housing 20, with the through-hole 21 being sheathed by the knob 55 and locked into the bore 45 on the lock bolt 40 by the screw 56, thereby forming an integral body. The latching plane 44 on the top end of the lock bolt 40 can be latched into a corresponding non-circular hole (not shown in the drawings) at a bottom surface of the knob 55, so as to rotate the lock bolt 40 along with the knob 55. On the other hand, another end of the spring 43 on the tenon 42 of the lock bolt 40 is connected to the positioning column 27 (as shown in FIG. 4) at the bottom surface of the housing 20. Finally, the housing 20 is covered on the seat 10, and these two casings are fixed at the slot holes 25 by transfixing the screws 19 into the through-holes 14 (as shown in FIG. 4) to form an integral body, thereby accomplishing an assembling of the tightening device 1.

Figure 5:
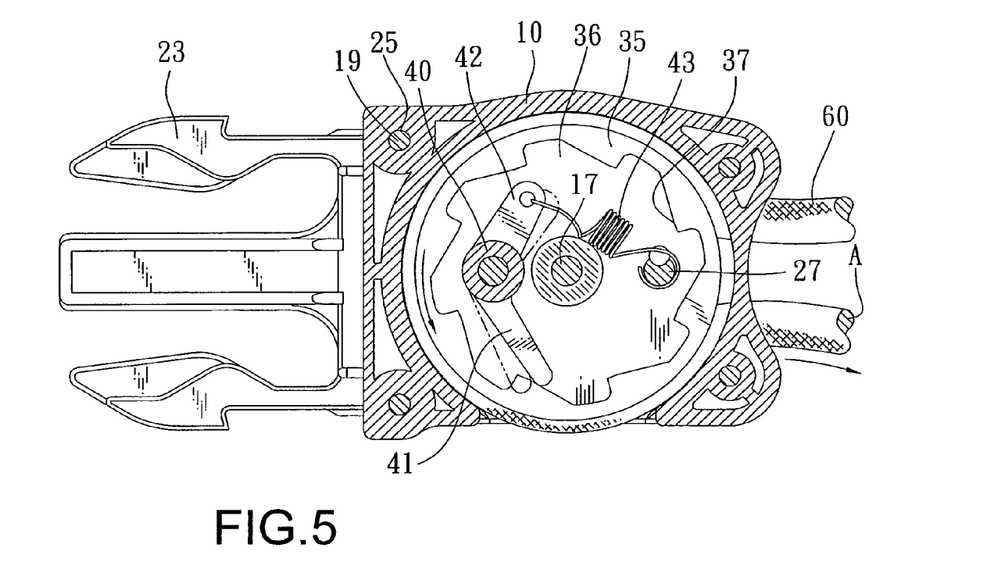
FIG. 5 shows a schematic view of a gliding of a rope of the present invention.
Figure 6:
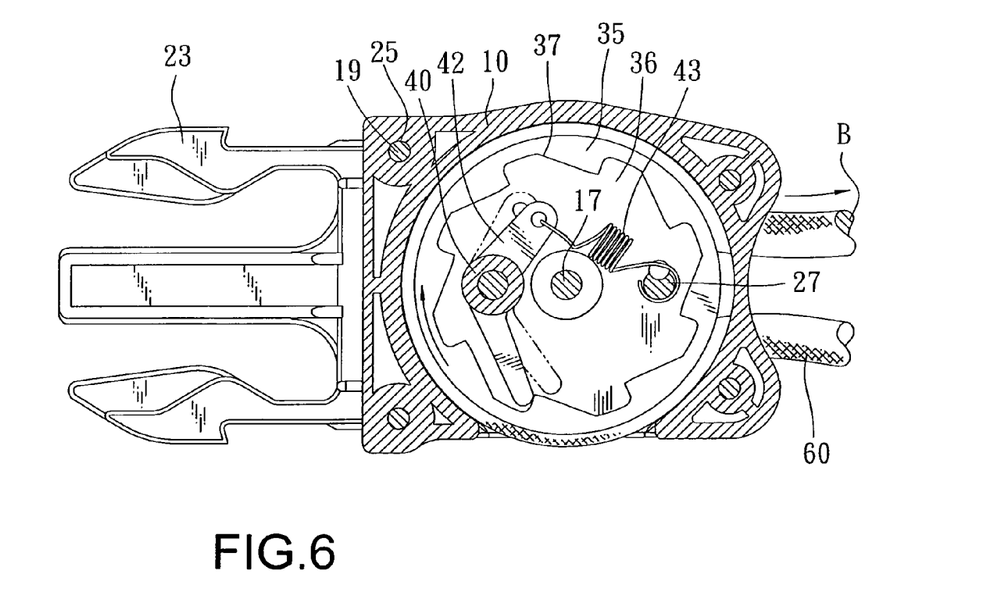
FIG. 6 shows as a schematic view of a rope being stopped from gliding of the present invention.

Referring to FIGS. 5 to 7, the rope 60 enters from the accesses 11, 10 12 of the tightening device 1, is reeved counterclockwise on the ridges 33 of the turntable 30 and the ridges 34 of the wheel 35, and passes out from the accesses 11, 12, as shown in FIG. 7. When the knob 55 is not rotating (as shown in FIG. 5), the depressing piece 41 of the lock bolt 40 is bouncing on the one-way ratchets 37 of the wheel 35; therefore, the wheel 35 can only rotate in one direction (counterclockwise), and the depressing piece 41 will jump on each of the one-way ratchets 37. Accordingly, the rope 60 can be only pulled out from a side A (as shown in FIG. 5), and if the rope 60 is pulled at another side B, it cannot be pulled clockwise due to the fact that the depressing piece 41 has been pressed against the one-way ratchets 37, thereby forming a glide-proof effect. On the other hand, when the knob 55 is manually rotated outside of the housing 20, the depressing piece 41 will be moved upward and released from the one-way ratchets 37; therefore, the rope 60 can be pulled from the side B (as shown in FIG. 6) instead.

Figures 8, 8A:
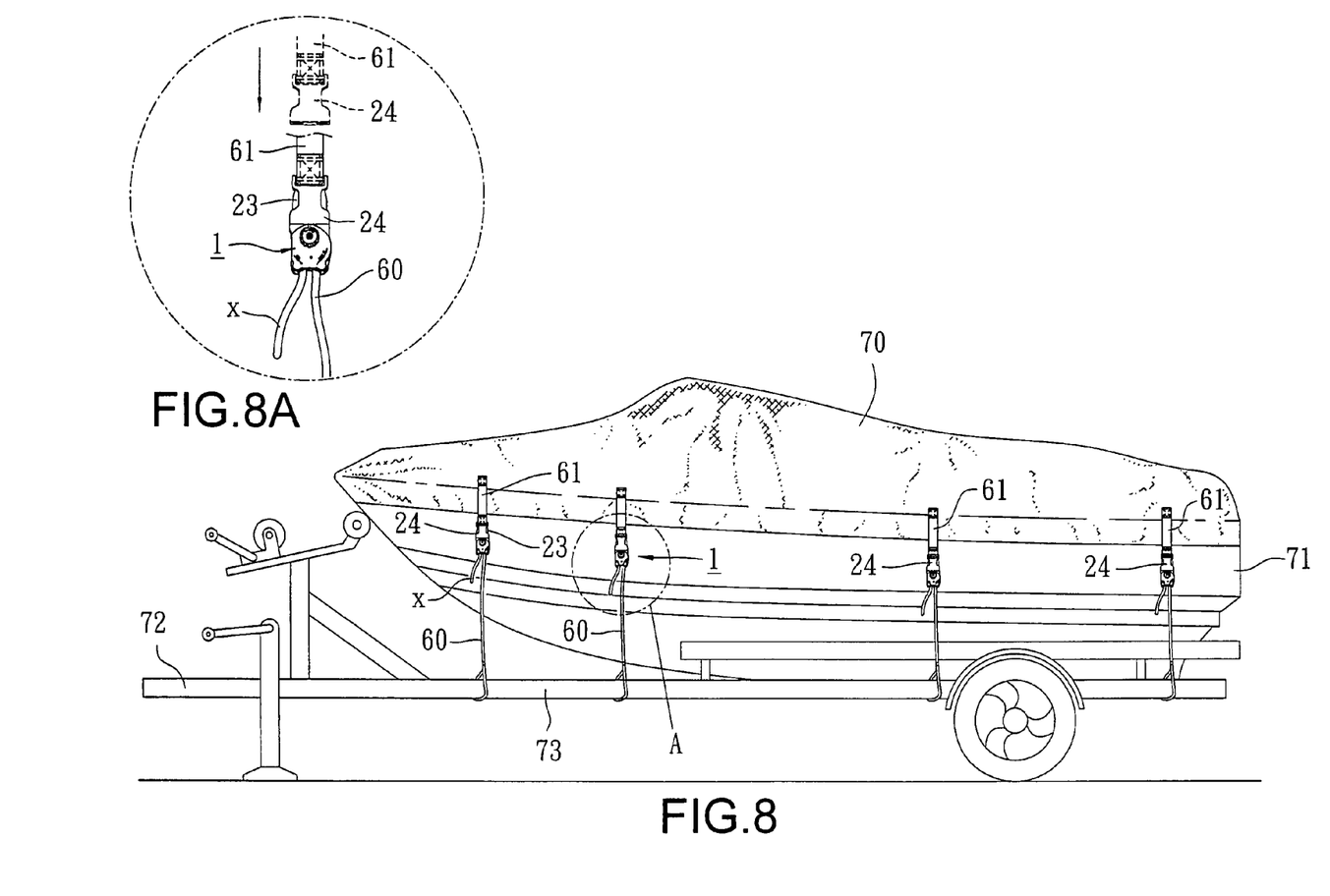
FIG. 8 shows a side view of an exemplified application of the present invention.
FIG. 8A shows a partial enlarged view of FIG. 8 of the present invention.
Figure 9:
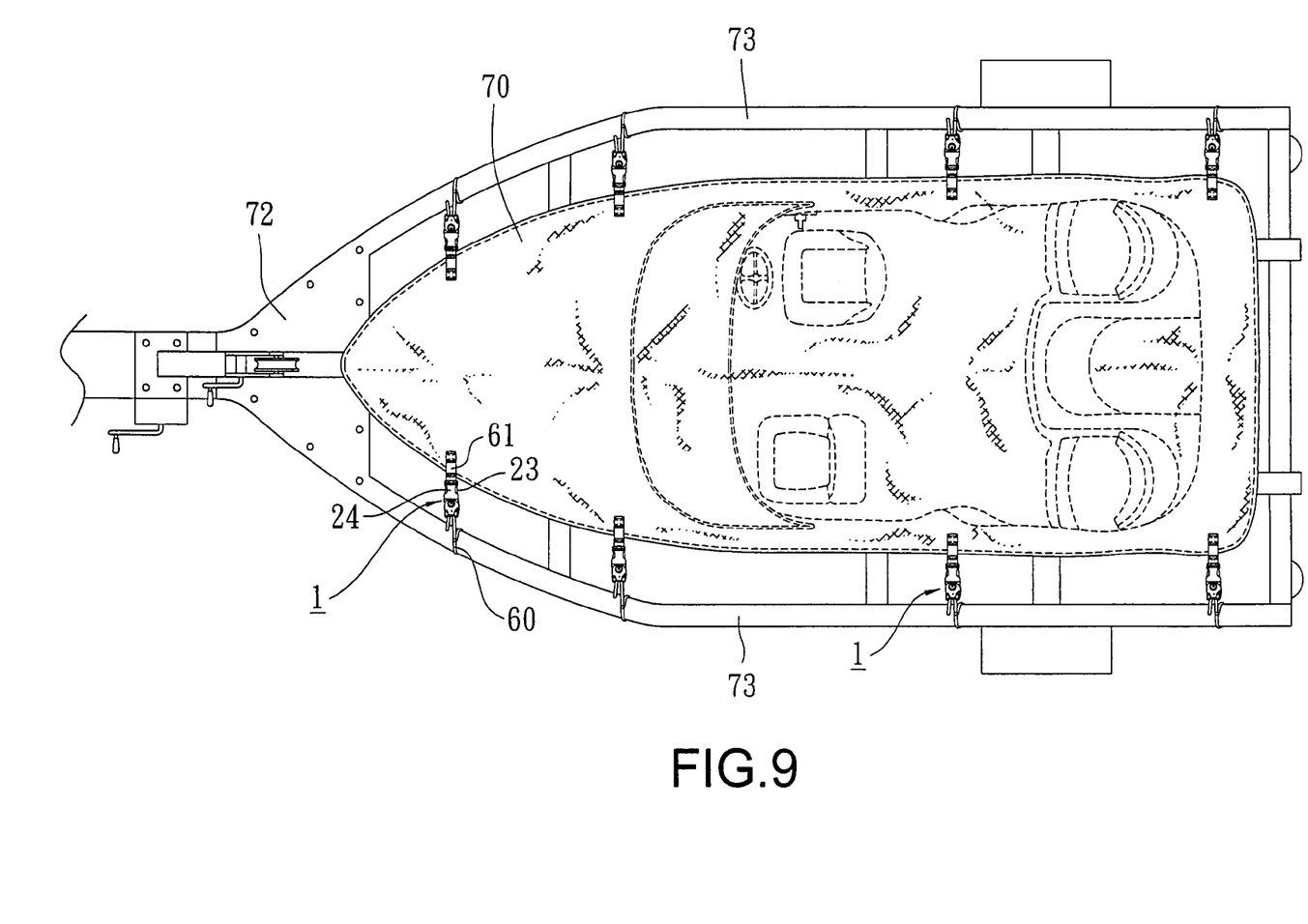
FIG. 9 shows a top view of an exemplified application of the present invention.

Referring to FIG. 8, FIG. 8A and FIG. 9, when the tightening device 1 is applied to a ship cover 70 to cover a ship body 71, a periphery on a top of cover cloth is sewn with a plurality of locking belts 61, a tail end of each of which is extended with a latching slot 24; therefore when the ship body 71 is carried by a transportation cart 72, ropes 60 can be tied on a transversal rod 73 at a periphery of the transportation cart 72 and be transfixed into the tightening device 1, such that a tenon 23 on the tightening device 1 can be quickly inserted into the latching slot 24, and then followed by pulling a rope end X at an exit for quickly and tightly locking the tightening device 1, thereby enabling the locking belts 61 to firmly extend the ship cover 70 to prevent the ship cover from being blown off by a strong wind when the ship body 71 is dragged at a high speed.

Figure 10:
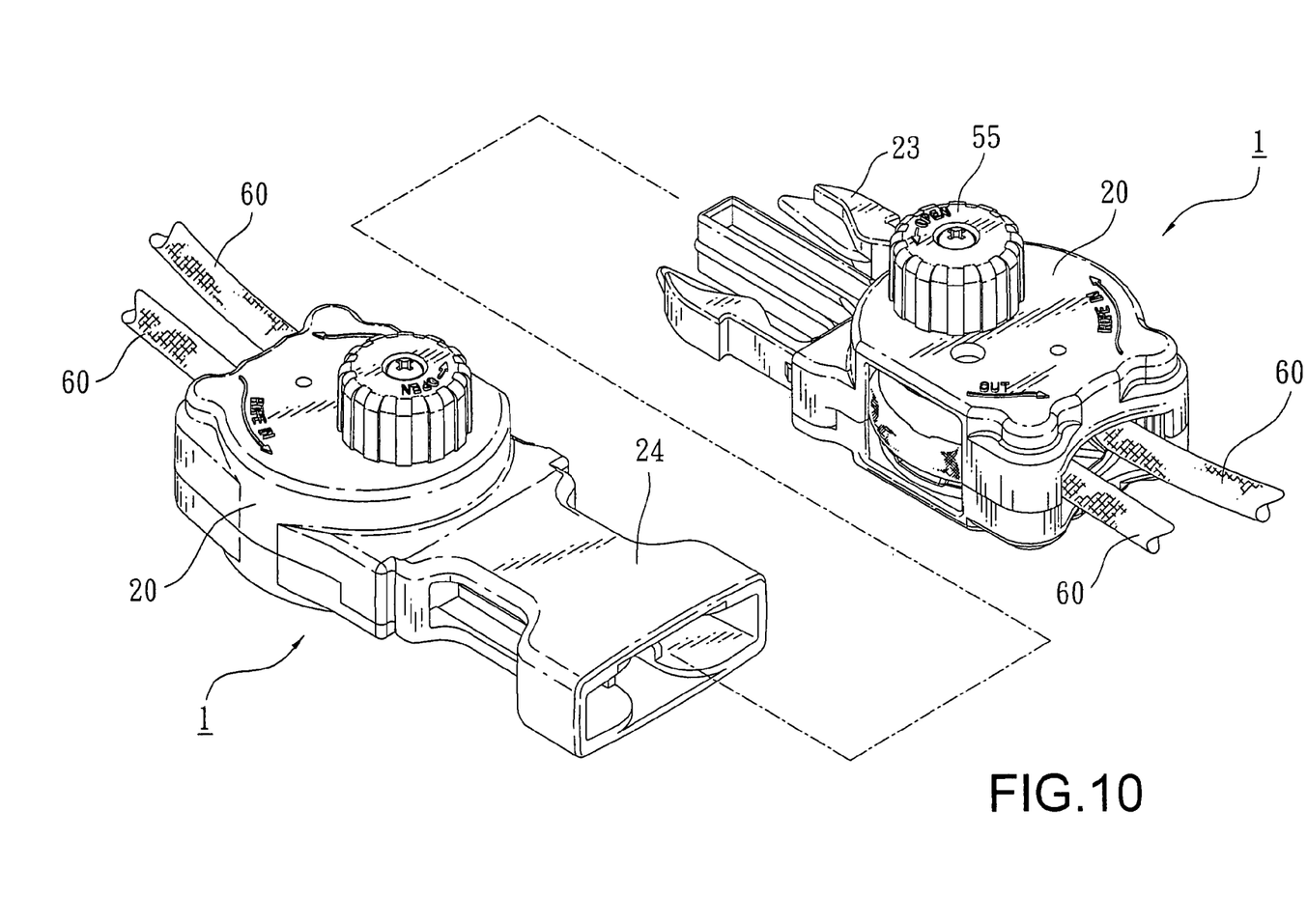
FIG. 10 shows a schematic view of another exemplified application of the present invention.

Referring to FIG. 10, in another embodiment of the present invention, another fitting is designed as a latching slot 24 which is assembled at a front end of the tightening device 1, such that a tenon 23 and the latching slot 24 which are assembled at front ends of two different tightening devices 1 can be quickly locked together.

Figure 11:
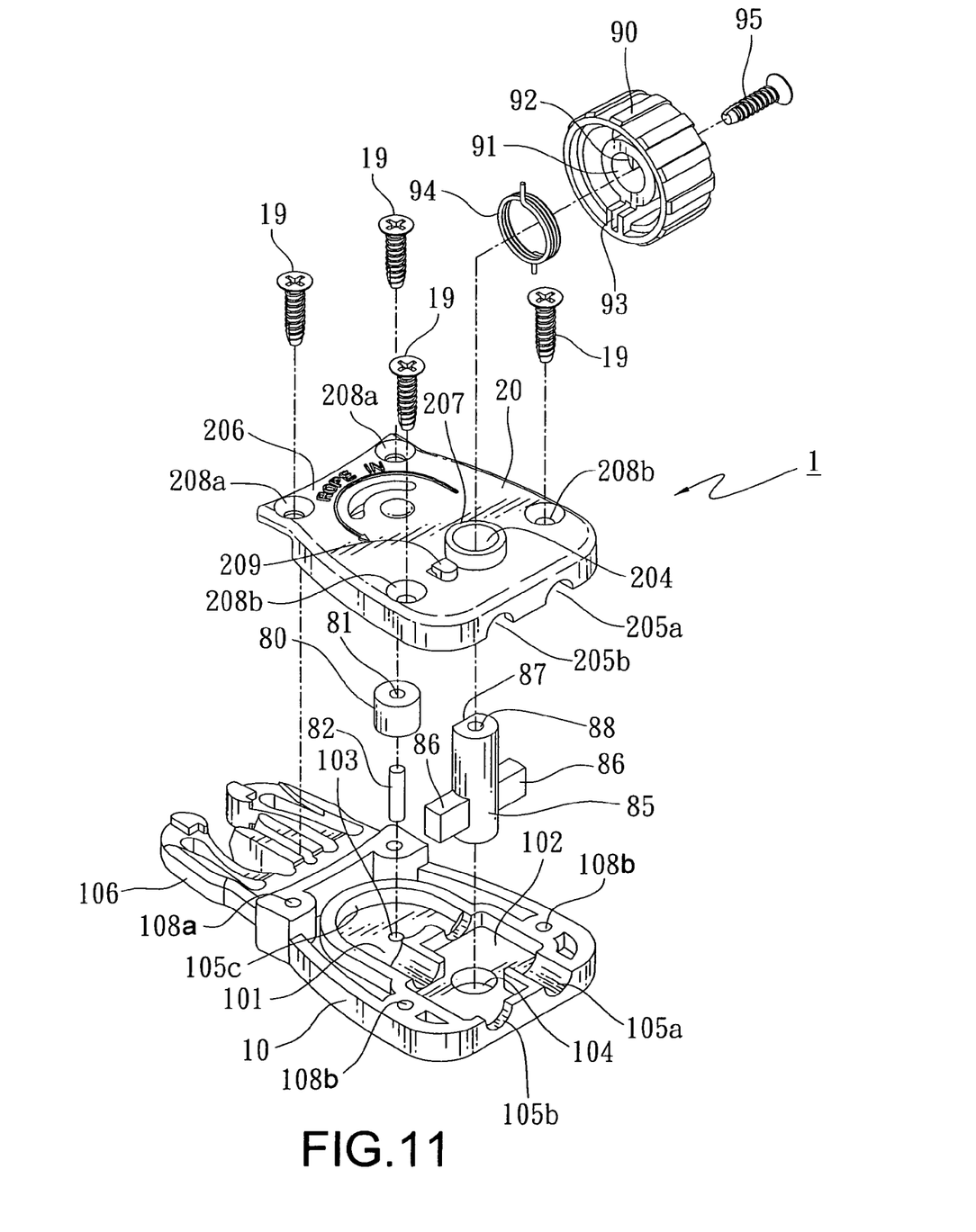
FIG. 11 shows an exploded view of a second embodiment of the present invention.
Figure 12:
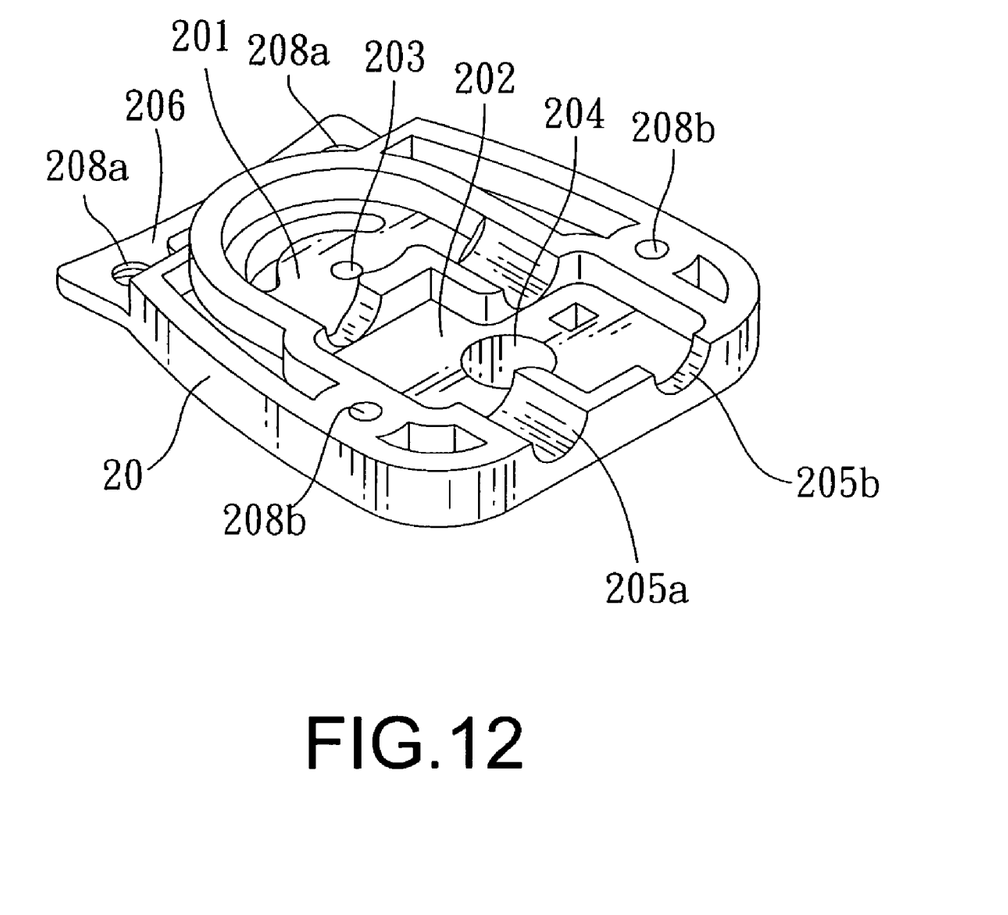
FIG. 12 shows a top view of a housing of the second embodiment of the present invention.
Figure 13:
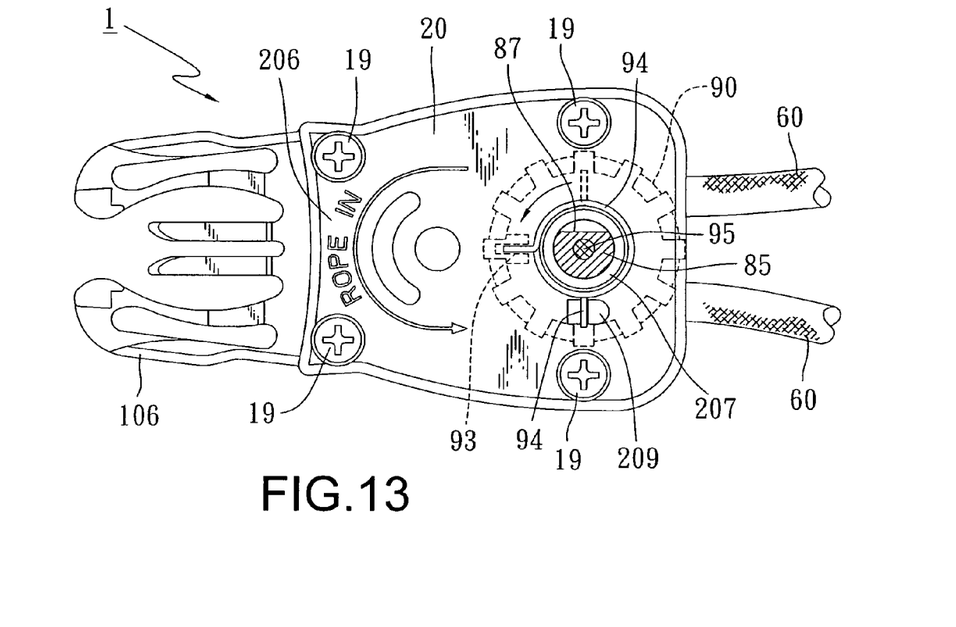
FIG. 13 shows a top view of the second embodiment of the present invention after being assembled.

Referring to FIGS. 11 to 13, a tightening device 1 of a second embodiment of the present invention comprises primarily a seat 10, a housing 20, a roller 80, a shaft 85, and a knob 90.

An interior of the seat 10 is provided with a first indentation 101 and a second indentation 102, wherein the first indentation 101 can provide for an installation of the roller 80 and a center of the first indentation 102 is provided with a slot hole 103, whereas the second indentation 102 can provide for an installation of the shaft 85, and the second indentation 102 is also provided with a positioning hole 104. A side of bottom part of the seat 10 is provided with a rope entrance groove 105a and a rope exit groove 105b which are transfixed into the first indentation 101 and the second indentation 102. An inner side of the first indentation 101 is formed with an arc-shape groove channel 105c. In this embodiment, a front end of the seat 10 is provided with a tenon 106, a periphery of which is installed with bores 108a; whereas two sides of the second indentation 102 are provided with bores 108b, respectively. The bores 108a, 108b can provide for screws 19 to be transfixed from a top to a bottom into bores 208a, 208b of the housing 20, to be locked and fixed together. A front end of the aforementioned seat 10 can be also provided with a latching slot (not shown in the drawings).

Referring to FIG. 12, an outer appearance of the housing 20 can be configured to be the same as that of the seat 10, and an interior of housing 20 is also provided with a first indentation 201 and a second indentation 202. A center of the first indentation 201 is provided with a slot hole 203, and an interior of the second indentation 202 is provided with a through-hole 204 which protrudes out of a top surface of the housing 20 to form a tube section 207 (as shown in FIG. 11). A bottom of the housing 20 is also provided with two grooves 205a, 205b which are transfixed into the second indentation 202 and connected with the first indentation 201, and a front end of the housing 20 is provided with a projection piece 206 on which is formed with the bores 208a, whereas two sides of the second indentation 202 are provided with the bores 208b respectively, such that the seat 10 and the housing 20 can be screwed together after being covered with each other.

Referring to FIG. 11, the aforementioned through-hole 204 is protruded out of the top surface of housing 20 to form the tube section 207 on which is installed with a knob 90 and a screw 95, such that the screw 95 can be transfixed into the knob 90 to be locked at a bore 88 at a top end of the shaft 85. A hook 209 is located beside the tube section 207 to latch an end of a spring 94. A center of the roller 80 is pivoted with a central hole 81, an interior of which is transfixed with a central column 82 such that the central column 82 can be positioned between a slot hole 103 and a slot hole 203. Two sides of the shaft 85 are provided with stopping blocks 86, respectively. An outer wall at a top end of the shaft 85 is provided with a latching surface 87, and the bore 88 is located at the top end. A center of interior of the knob 90 is provided with a shaft hole 91, and an interior of which is installed with a latching block 92. An interior of the knob 90 is provided with a spring 94, an end of which is locked at a latching slot 93 (as shown in FIG. 2 and FIG. 4) inside the knob 90, and the other end of which is locked at the hook 209.

In assembling, the roller 80 is installed inside the first indentation 101 of seat 10 and the first indentation 201 of housing 20, and a central column 302 is transfixed into a center of the roller 80, such that two ends of the central column 302 can be latched and positioned into the slot holes 103, 203 of the seat 10 and housing 20, respectively. In the mean time, the shaft 85 is installed inside the second indentation 102 of seat 10 and the second indentation 202 of housing 20, such that a bottom end of the shaft 85 is sheathed into the positioning hole 104 of seat 10, and a top end is transfixed into the through-hole 204 of housing 20 and is protruded out of a surface of the tube section 207. In addition, the screws 19 are transfixed from a top to a bottom into the bores 208a, 208b of housing 20 to be locked into the bores 108a, 108b of seat 10; whereas the grooves 105a, 105b of seat 10 are covered with the grooves 205a, 205b of housing 20 to constitute a rope entrance a and exit b. Next, the shaft hole 91 of knob 90 is sheathed at a top end of the shaft 85, such that the latching block 92 inside the shaft hole 91 can be engaged with the latching surface 87 of shaft 85. Therefore, when the knob 90 is rotated, the shaft 85 is rotated at the same time accordingly. On the other hand, the other end of spring 94 inside the knob 90 is latched at the hook 209 of housing 20, such that the knob 90 can be elastically restored after being rotated. In addition, the knob 90 is combined with the shaft 85 by transfixing the screw 95 into the bore 88 of shaft 85 to be locked and fixed, thereby accomplishing the assembling of tightening device 1.

Figure 14:
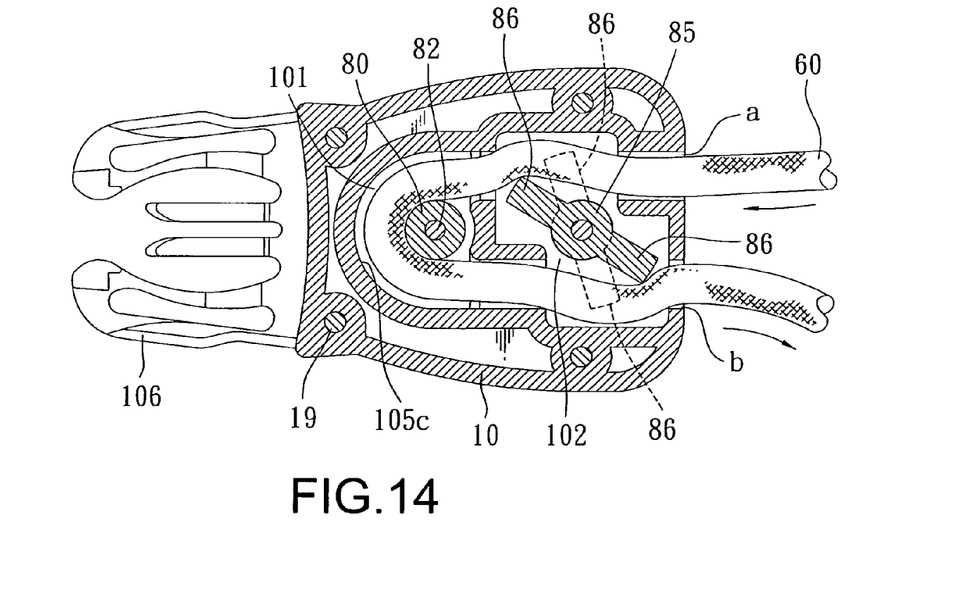
FIG. 14 shows a schematic view of reeving a rope of the second embodiment of the present invention.
Figure 15:
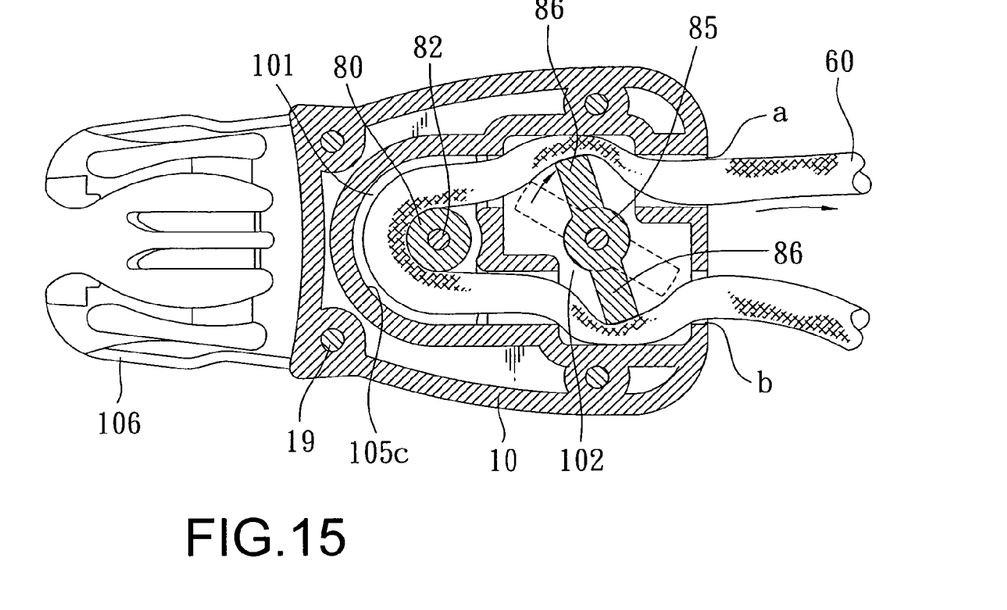
FIG. 15 shows a schematic view of rotating a shaft to clamp a rope of the second embodiment of the present invention.

Referring to FIG. 14 and FIG. 15, a rope 60 enters from the entrance a of tightening device 1, passes through the stopping block 86 at one side of the shaft 85, reeves around the roller 80 counterclockwise, passes through the arc-shape groove channel 105c and changes a direction, passes through the stopping block 86 at the other side of the shaft 85, and then passes out from the exit b (as shown in FIG. 14). When the rope 60 is pulled at the entrance a (clockwise as shown in FIG. 15), the shaft 85 is affected by an elastic restoration of the spring 94, and the stopping blocks 86 of shaft 85 are dragged by a friction on surfaces of the rope 60, such that the rope 60 is clamped by side edges of the two stopping blocks 86 from pulling the rope 60 clockwise, and is restricted without being able to move back. Therefore, the rope 60 cannot be rotated clockwise and pulled, thereby forming an effect of one-way tightening.

Figure 16:
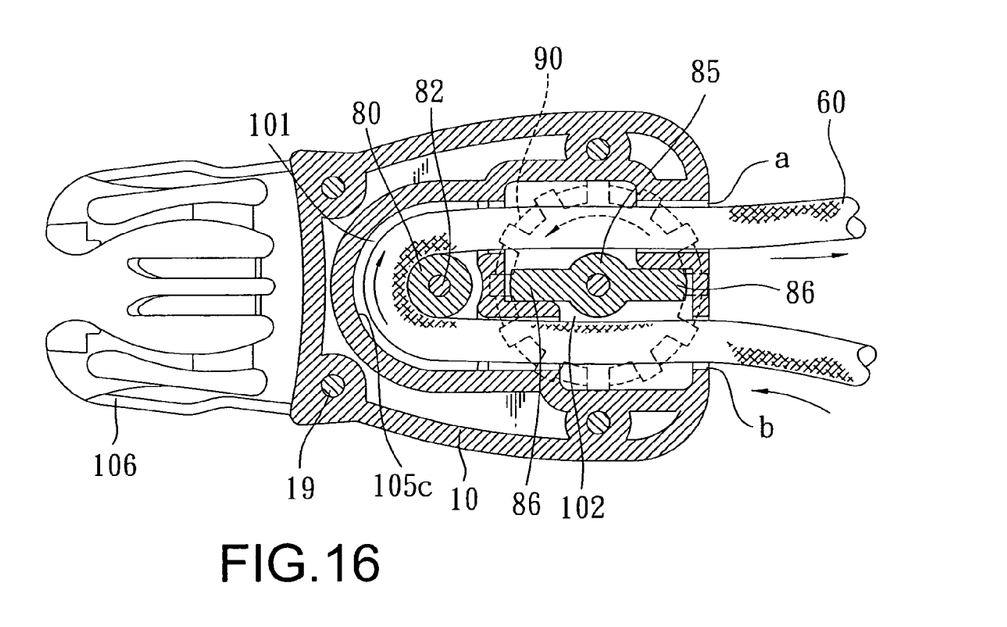
FIG. 16 shows a schematic view of rotating a shaft to release a rope of the second embodiment of the present invention.

Referring to FIG. 16, when the knob 90 is rotated counterclockwise manually at an exterior of the housing 20, the stopping blocks 86 at two sides can be deflected to be refrained from being in contact with the rope 60, such that the rope 60 can be released from a clamping state, and can be pulled out from the entrance a.

Accordingly, the present invention provides an improved structure of tightening device which is surely to achieve the expected objects of invention, is not definitely provided with a value of practicability.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A latch-type tightening device structure comprising a body which is constituted by a seat and a housing, and is provided with a one-way braking mechanism to enable a rope to glide in one direction, wherein the rope enters into the tightening device to reeve around the one-way braking mechanism which enables the rope to glide in one direction, and a front edge of the body is provided with a tenon, such that the tightening device can be quickly locked with a fitting part in application, an interior of the body is provided with two rollers, one turntable, one wheel, and one lock bolt, wherein an access is located at a rear end of the seat with two sides of the access being provided with a screw hole respectively, two rollers are latched at two sides of the access, an indentation is located at a central position in an interior of the seat with a hole in a center of the indentation, a central column is latched into the hole for positioning, and a projection piece is located a front end of the seat with two sides of a root part of the projection piece provided with a through-hole respectively; an access is located at a rear end of the housing with a bore located at a periphery of the access, an indentation is located at a central position in an interior of the housing, a hole is located at a center of the indentation, a through-hole is located on the housing, and a slot hole is located at a front end of the housing; a through-hole is located at a center of the turntable, a positioning hole is located at a side of the through-hole, and ridges, which are radially extended, are located at a periphery of the through-hole; a hollow part is located at a top surface of the turntable, one-way ratchets are located at a periphery of the hollow part, a central column having a through-hole and radially extending ridges are located at a bottom surface, and a column head is located at a side of the central column; a depressing piece and a tenon are located at two sides of the lock bolt respectively, a bore is located at a top end of the lock bolt, a hole is located on the tenon with an end of a spring inserted in the hole, and the other end of the spring is hooked on the positioning column of the housing, the depressing piece is pressed against the one-way ratchets of turntable, a latching plane is located on an exterior wall at a top end of the lock bolt, and the lock bolt being rotated by a connection and control of a knob; the housing being covered on the seat, and screws being used to assemble the two casings from a bottom to a top, so as to form an integral body, a rope entering from a side of the access at a bottom of the tightening device and reeved on the turntable and wheel, followed by passing out from another side of the access.

2. The latch-type tightening device structure according to claim 1, wherein the lock bolt passes out from the through-hole of housing, and a screw is used to pass through the knob to connect with the lock bolt and knob, and the latching plane is located on an exterior wall at a top end of the lock bolt for latching the knob.

3. The latch-type tightening device structure according to claim 1, wherein a front end of the housing is provided with a tenon.

4. The latch-type tightening device structure according to claim 1, wherein a front end of the housing is provided with a latching slot.

5. The latch-type tightening device structure according to claim 1, comprising a body constituted by a seat and a housing, an interior of the body is provided with a one-way braking mechanism including a roller and a shaft, wherein an interior of the seat is provided with a first indentation and a second indentation, the first indentation is provided with a slot hole, the second indentation is provided with a positioning hole, a bottom of the seat is provided with a rope entrance groove and a rope exit groove which are transfixed into the second indentation, and a front end of the seat is provided with a tenon; an interior of the housing is provided with a first indentation and a second indentation, the first indentation is provided with a slot hole, the second indentation is provided with a through-hole which is protruded out of a top surface of the housing to form a tube section, a hook is located beside the tube section, a bottom of the housing is provided with a rope entrance groove and a rope exit groove, both of which are transfixed into the second indentation, and a front end of the housing is provided with a projection piece; a center of the roller is provided with a central hole, and an interior is transfixed with a central column which is positioned between the first indentations of the seat and the housing; a side edge of the shaft is provided with a stopping block, a top end of the shaft is installed with a bore and being protruded out from the tube section of through-hole of housing, and the shaft is fixed and assembled with a knob by transfixing a screw into the knob; a center in an interior of and a side edge of the knob is provided with a shaft hole and a latching slot respectively, a spring is located in an interior of the knob, and an end of the spring is locked at the latching slot; the knob being fixed at a top end of the shaft by transfixing a screw into the knob; the housing is covered on the seat, and the housing and the seat are fixed with screws to be locked into an integral body, the rope enters into an entrance at a bottom of the tightening device, passes through the stopping block at one side of the shaft, reeves around the roller, passes through the stopping block at the other side of shaft, and then exits out of the tightening device.

6. The latch-type tightening device structure according to claim 5, wherein a front end of the seat is provided with a latching slot.

7. The latch-type tightening device structure according to claim 1, wherein the tenon installed at the front edge of body is replaced by a latching slot.

* * * * *